W. M. HOFFMAN.
APPARATUS FOR OPERATING AND CONTROLLING FUEL OIL BURNERS.
APPLICATION FILED AUG. 6, 1919.
1,341,642.
Patented June 1, 1920.
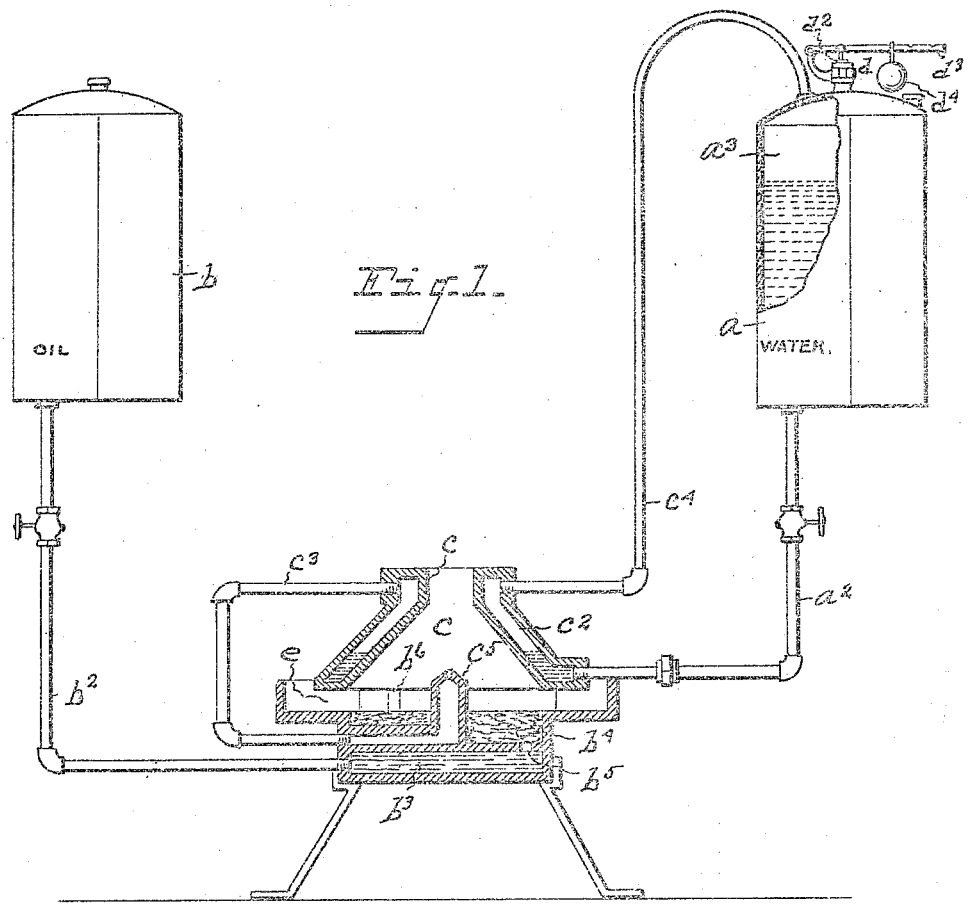
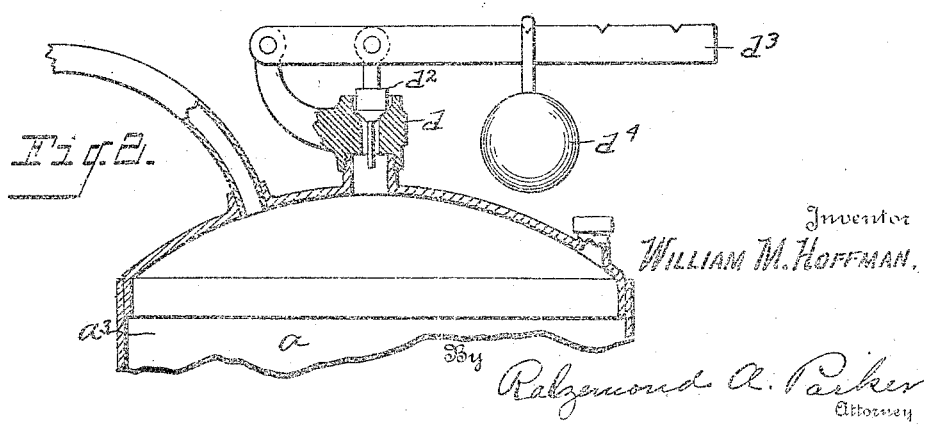
Inventor
WILLIAM M. HOFFMAN,
By Ralzemond A. Parker
Attorney

UNITED STATES PATENT OFFICE.

WILLIAM M. HOFFMAN, OF BUFFALO, NEW YORK, ASSIGNOR TO HOFFMAN PRODUCTS CORPORATION, OF BUFFALO, NEW YORK.

APPARATUS FOR OPERATING AND CONTROLLING FUEL-OIL BURNERS.

1,341,642.

Specification of Letters Patent.    Patented June 1, 1920.

Application filed August 6, 1919. Serial No. 315,599.

*To all whom it may concern:*

Be it known that I, WILLIAM M. HOFFMAN, a citizen of the United States, residing at Buffalo, county of Erie, State of New York, have invented a certain new and useful Improvement in Apparatus for Operating and Controlling Fuel-Oil Burners, and declare the following to be a full, clear, and exact description of the same, such as will enable others skilled in the art to which it pertains to make and use the same, reference being had to the accompanying drawings, which form a part of this specification.

My invention relates to apparatus for operating and controlling fuel oil burners and the object of my improvement is to secure a determined standard of combustion in a combustion chamber in which to the products of combustion of fuel oil and air is added a jet of water vapor under desired pressure and of a desired quantity and to automatically regulate and maintain such attained standard of combustion.

In the drawings:

Figure 1 is an elevation partly in section of an apparatus by which the method of my invention may be performed.

Fig. 2 is a detail sectional view of the top of the water reservoir $a$.

I attain the objects desired in the following manner: Fuel tank $b$ through conduit $b^2$ supplies in quantity desired fuel oil to the burner. The fuel oil enters the receptacle $b^3$ in the lower portion of the burner and passes through a series of circumferentially disposed apertures $b^5$ in its upper wall into combustion chamber $b^4$. Mixing cone $c$ which is supported by radially extending fins $b^6$ carried in the combustion vessel, is provided with a jacket $c^2$ which is supplied with water through conduit $a^2$ from elevated water reservoir $a$, the flow of which may be regulated when the device is set in operation by means of a valve provided in the conduit. An air passageway $e$ is provided underneath the lower edge of the mixing cone $c$ through which air will be drawn to the burning fuel in $b^4$.

The method of operation is as follows:

The desired amount of water may be admitted to the jacket $c^2$ of the mixing cone $c$ from the reservoir $a$. Fuel supplied from the fuel tank $b$ to the burner is ignited and mixing with air drawn through the circumferential passageway $e$ burns quietly therein. The heating of the mixing cone vaporizes the water contained in the jacket $c^2$ and as the vapor pressure exceeds the atmospheric pressure, it passes through conduit $c^3$ through nozzle $c^5$ and is projected as a jet of vapor axially up through the cavity of the mixing cone, mixing with the products of combustion and producing a more intense combustion. Increased heating of the mixing cone produces a drier vaporization and at a higher temperature in $c^2$, consequently the pressure of the vapor jet through nozzle $c^5$ is increased which produces in ratio to such increase an increased draft of air through the passageway $e$ and a more intense, efficient combustion results.

Vapor pressure is regulated as follows:

Through conduit $c^4$, which is of small cross sectional area to prevent heavy condensation, water vapor under its own pressure passes to the top of the water reservoir as at $a^3$.

In the normal operation of the device as thus far described, a variation in intensity of combustion might be produced in the mixing cone from a variation in fuel or air supply or other external causes, which would cause a temporary fluctuation in vapor pressure in the vapor generator affecting the water level in the generator, and also producing a variation in the pressure under which the steam jet entered the mixing chamber through the nozzle $c^5$. This steam jet would not only vary as to the pressure under which it entered the mixing chamber and thereby cause an increase or decrease in the air draft through $e$, but would also vary in quality as to the amount of water particles it carried, as to its dryness and heat, and an irregular partially efficient fire would result. These possible variations in combustion would necessitate the burner receiving the attention of the operator at all times, and would prevent its being left any length of time unattended. This would be particularly objectionable in the use of a burner in a heating plant. To overcome this difficulty the burner is turned down, admitting a predetermined rate of flow of fuel thereto and through regulation of the vapor pressure with its consequent regulation of the water level in the jacket $c^4$ control of vapor jet and its resulting control of the air draft $e$, the required standard of combustion in the mixing chamber is maintained. The vapor pressure is regulated and maintained as desired by the use of an ordinary safety valve in the head of the water reservoir. The operation of said valve is familiar and is not considered necessary for any further explanation thereof. This valve may be set as is apparent to maintain any desired vapor pressure. It is further evident that a reservoir of water vapor under pressure is held in $a^3$. Due to the small capacity of $c^2$ the production of water vapor therein is practically an instantaneous though continuing process and in case of variation of such pressure as heretofore referred to, water vapor could pass from such water vapor reserve, keeping a substantially constant vapor pressure at the nozzle $c^5$.

What I claim is:

1. In a liquid fuel burner, a combustion chamber, a conical mixing chamber the hollow jacket of which serves as a water vapor generator superimposed over said combustion chamber in such a manner that a circumferential air passageway to said burner is provided beneath the lower edge of the jacket thereof, means connecting said vapor generator and said mixing chamber providing a conduit for vapor from said generator to said chamber terminating in a nozzle axially disposed in said burner so as to project a jet of vapor coaxially upward with the flow of the products of combustion in said burner, an elevated water reservoir, means communicating therefrom to the lowest point of said vapor generator through which the water may pass, vapor communicating means from the upper portion of said generator to the upper end of said water reservoir, a safety valve disposed in the upper end of said water reservoir to control vapor pressure therein.

2. In a liquid fuel burner, a combustion chamber, a mixing chamber provided with a hollow jacket which serves as a water vapor generator disposed above said combustion chamber in such a manner as to be heated thereby and provide an air draft passageway to the combustion chamber underneath the lower edge of the jacket, vapor communicating means between said vapor generator and said mixing chamber terminating in said mixing chamber in a nozzle which is disposed axially through said combustion chamber to project a jet of vapor coaxially upward with the flow of the products of combustion, a water reservoir, water communicating means therefrom to the lowest part of said vapor generator, vapor communicating means from said generator to the upper portion of said water reservoir, so positioned that vapor flowing back from said reservoir must pass through the vapor generator before reaching the vapor conduit leading to the nozzle, a valve disposed in the upper end of said water reservoir to regulate vapor pressure therein.

In testimony whereof I sign this specification.

WILLIAM M. HOFFMAN.